Feb. 2, 1954

A. N. RITTINGER 2,667,963

PRINT STRIPPING MECHANISM

Filed Nov. 10, 1951

3 Sheets-Sheet 2

INVENTOR.
Adam N. Rittinger
BY
Barlow & Barlow
ATTORNEYS.

Feb. 2, 1954 A. N. RITTINGER 2,667,963
PRINT STRIPPING MECHANISM
Filed Nov. 10, 1951

INVENTOR.
Adam N. Rittinger
BY
Barlow & Barlow
ATTORNEYS

Patented Feb. 2, 1954

2,667,963

UNITED STATES PATENT OFFICE 2,667,963

PRINT STRIPPING MECHANISM

Adam N. Rittinger, Rochester, N. Y., assignor to Photostat Corporation, a corporation of Rhode Island Application November 10, 1951, Serial No. 255,791

11 Claims. (Cl. 198—178)

Invention relates to improvements in a photographic copying camera, particularly a camera in which the film after exposure thereof is picked up by an endless conveyor which is armed with pins upon which the film is impaled to be dragged or carried by the conveyor through a path in which are located the various baths for treating the print.

An object of the invention is to provide improved means for disengaging prints from a conveying means.

Another object of the invention is to provide improved means carried by the conveyor for disengaging prints from the conveyor.

Another object of the invention is to provide a conveyor stopping means which is operable upon failure of a print to be properly disengaged from the conveyor means.

With these and other objects in view, the invention consists of certain novel features of construction as will be more fully described and particularly pointed out in the appended claims.

Figure 1:
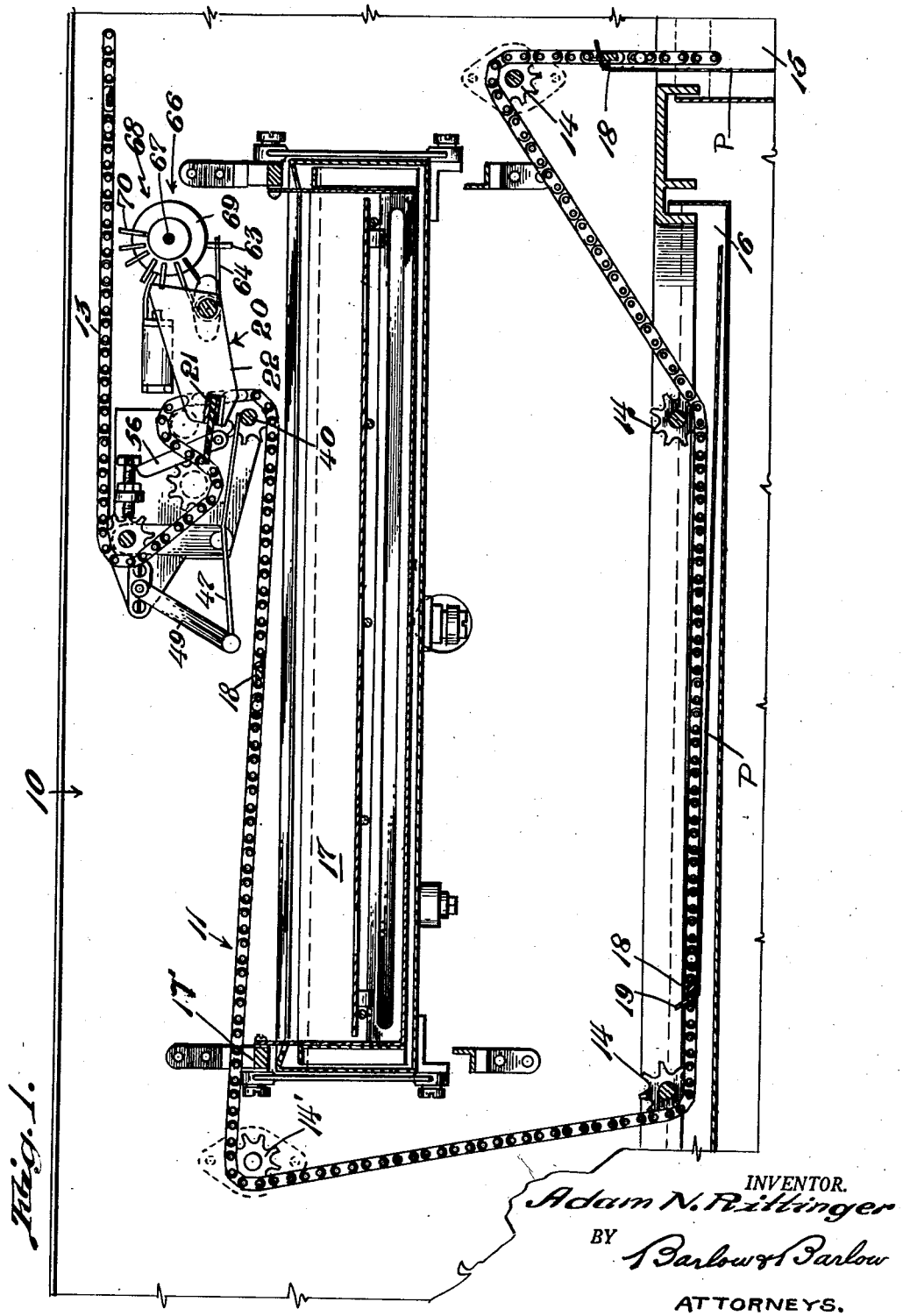
Figure 2:
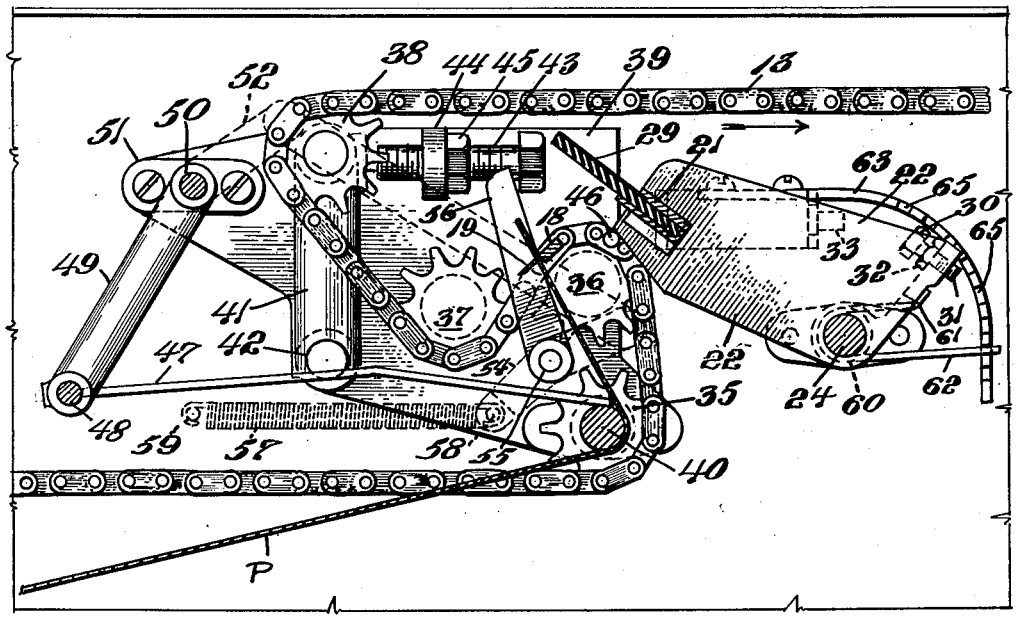
Figure 3:
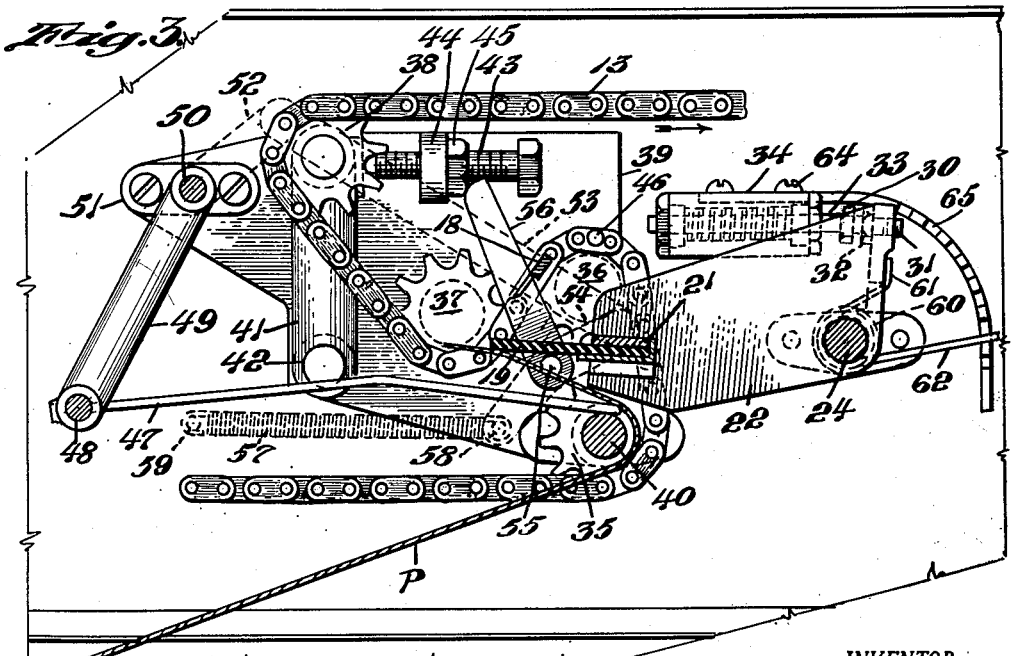
Figure 4:
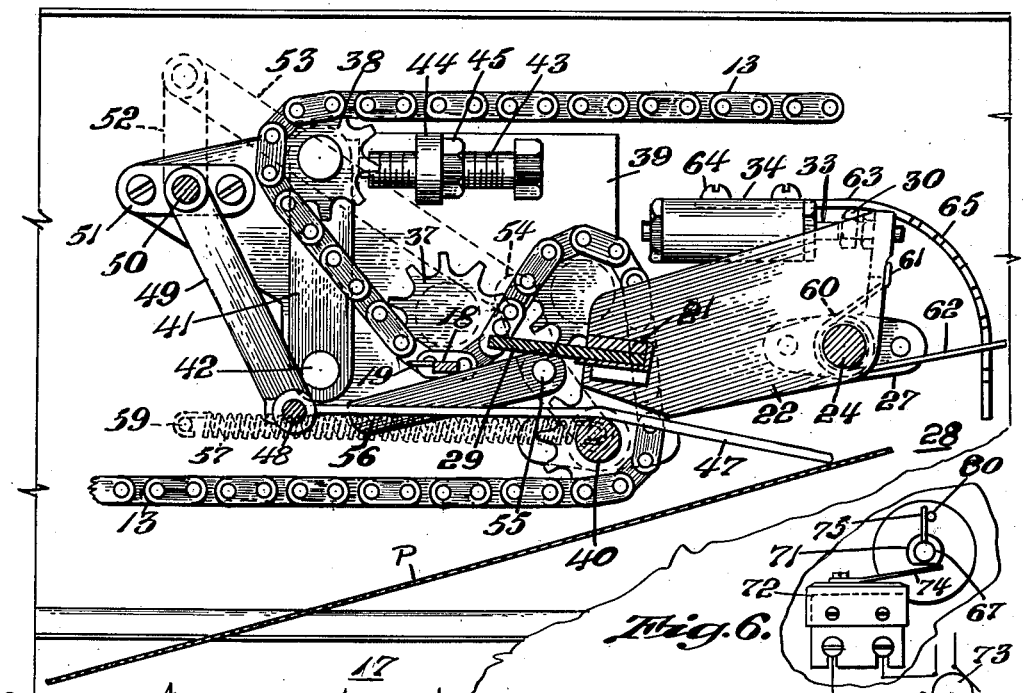
Figure 6:
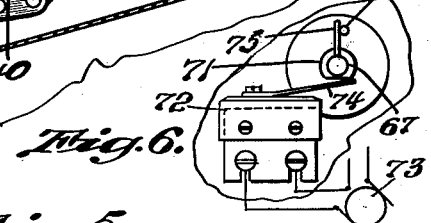
Figure 5:
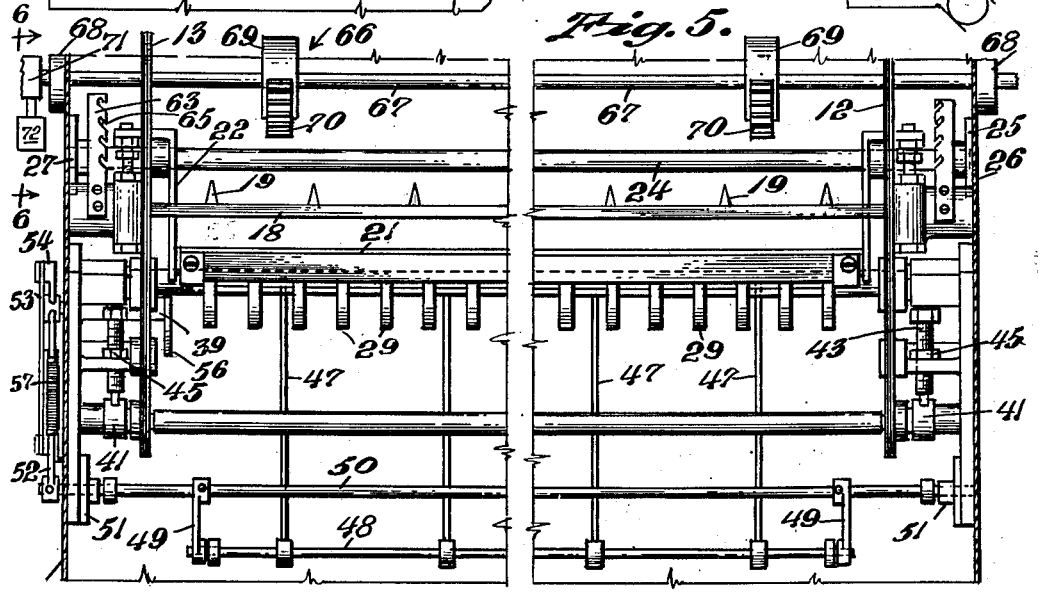

In the accompanying drawings:

Figure 1 is a longitudinal sectional view of a fragmental portion of a copying camera or apparatus embodying my invention;

Figures 2, 3, and 4 are fragmentary portions of the apparatus of Figure 1 showing different relative positions of the print stripping mechanism on an enlarged scale;

Figure 5 is a plan view partially in section of a fragmental portion of the camera looking down upon the stripper mechanism and the means for arresting the travel of the conveyor upon failure of a print to be properly dislodged from the conveyor means; and Figure 6 is a view looking at the side of the camera in the direction of the arrows on line 6—6 of Figure 5 and showing a switch placed in the circuit of the motor for driving the conveyor.

Referring to the drawings for a more detailed description of the invention, 10 (Fig. 1) designates generally a portion of a photographic copying camera, this being shown only so much as is necessary for an understanding of the invention. The exposed film portion which is usually a sensitized coated paper stock after exposure is led out of the focal plane of the camera, then severed from the supply roll and moved to a location to be in position to be picked up by one of the pin bars of an endless conveyor designated generally 11. The conveyor comprises two endless chain elements 12—13 (Fig. 5) which are positioned one at each side of the camera body. These elements are trained over suitable sprocket gears designated generally 14 (Fig. 1), certain of which are driven by an electric motor (not shown). There is positioned in the path of the conveyor a tank 15 in which is contained the print developing solution, a tank 16 containing water for rinsing the print, and a tank 17 containing the hypo or fixation bath.

Pin bars extend transversely between and are connected to the chains 12 and 13, and each is provided with a plurality of pointed elements or pins 19 which extend beyond the bar in the direction of travel of the chains. The print P, which is deposited at a point to be picked up, has its marginal edge in position to be pierced and impaled on the pins 19 of the pin bar 18. The print is passed through the developing bath in the tank 15 and then rearwardly into the rinsing bath in the tank 16 and then passes over a sprocket 14' causing a reverse of its direction so as to move forward over the tank 17. As the print is advanced, it is guided over the edge 17' of the tank 17. When the trailing end edge of the print passes beyond the said edge 17', the said trailing edge will drop into the bath contained in tank 17. At this position of the conveyor, the print is dislodged or stripped from the pin bar 18 by a stripper mechanism designated generally 20.

This mechanism comprises a stripper bar 21 which extends transversely between two arms 22 and is secured thereto in any appropriate manner. The arms 22 are similar to each other and each is secured to one side of the camera on a transversely extending shaft 24 and inwardly of the chains 12—13 and adjacent thereto. The shaft 24 is in turn journaled at one end in a bracket 25 (Fig. 5) fixed to the side 26 of the camera body and is journaled at the other end in a bearing 27 fixed to the side 28 of the camera body. The stripper bar 21 is armed with a plurality of space resilient fingers 29, which may be made of a flexible elastic rubber-like material and secured to the bar 21. These fingers project outwardly from the bar 21 to extend a substantial distance beyond the free end of the arms 22. The arms 22 are moved in unison by shaft 24, and each is provided with an adjustable stop 30 which is in the form of a threaded bolt 31 secured to the arm and located in adjusted position thereon by means of a lock nut 32. The head of the bolt projects to engage with a resilient plunger 33 housed within a casing 34 secured to the sides 26—28 of the camera. The arms 22 are weighted and so positioned as to move or fall by gravity, and the stop 30 will engage against the plunger 33 to limit the downward movement of the arms and also dampen the same.

The stretches of the chains 12 and 13 adjacent the stripper mechanism 21 are made to travel through a reverse S path guided by a plurality of sprocket gears 35, 36, 37, and 38. These sprockets are so related to each other that the chains moving forwardly over the tank 17 will move beneath and upwardly over the sprocket 35 over sprocket 36 and then in a reverse direction generally downwardly beneath the sprocket 37, the chain then passing over the far side of sprocket 38 and there reversed to again resume the forward direction of travel. The sprocket gear 35 is mounted on a shaft 40 which extends transversely between the sides 26—28 (Fig. 5) and is journaled in the said bracket 39. The sprockets 38 are arranged to provide for tensioning the chains, and each is mounted on an arm 41 which is pivoted at its lower end as at 42 on the bracket 39. A threaded member 43 extends through an ear 44 projecting from the bracket 39 and extends therefrom into engagement with the arm 41. Turning the member 43 will move the sprocket 38 thereon to tension or release the tension of the chain depending upon the direction of turning of said member 43. The threaded member 43 is locked in adjusted position by means of a lock nut 45.

Each chain 12—13 carries a plurality of spaced pins 46 which are attached to the second link of the chain which follows the link to which the pin bar 18 is secured. The relationship between the arms 22 and the stretches of the chains 12 and 13 at the point of the reversal of the direction of movement thereof is such that one overlaps the other, and the pins 46 project from the said chains to engage the lower edge of the arms 22 and raise or swing said arms 22 about the axis of the shaft 24 or in a clockwise direction as seen in Figures 2, 3, and 4.

The marginal edge of the print P is carried by the chain past the forward edge of the arms 22. Further movement of the chain over the sprockets 35—36 will place a reverse bend in the said print P as seen in Figure 2. At near the position of the pins 46 passing beyond the end of the arms 22 the pin bar 18 will have passed slightly beyond the upper center of the sprocket 36 as seen in Figure 2. At this position the element 19 on the pin bar 18 will be so located as to extend its point away from the stripper bar 21, and the bar 18 will be in a position to be engaged by the resilient fingers 29 upon falling of the stripper 21. Upon further movement of the chains in the same direction, the pin 46 will pass beyond the said arms 22 to be free of the said pins 46 to fall or move by gravity. Further, the resilient fingers 29 will strike the print at the reversed bend thereof and dislodge the print from the elements 19.

In order to assure that the print P, after being freed of the pin bar 18, will quickly fall into the hypo bath, a plurality of pusher members or fingers 47 are secured in an appropriate manner to a rod 48 which extends transversely between the sides of the camera (see Figure 5) and is supported at its end for free turning movement on links 49. These links 49 depend from a transversely extending shaft 50 (Figs. 2, 3, 4) journaled in bearings 51 attached to the brackets 39. The fingers 47 extend forward, and their free ends rest on the shaft 40. One end of the shaft 50 extends through and beyond the side 28 of the camera (see Fig. 5) and has fixed thereto at this extending portion a crank 52 which in turn is connected by means of a link 53 to a lever 54. This lever 54 is secured substantially centrally thereof to a stub shaft 55 which passes through the side 28 and is suitably journaled in the bracket 39 attached to the side 28. The inner end of the shaft 55 extends inwardly of the chain 13 and has attached thereto for movement therewith an arm 56 which extends normally upwardly as shown in Figure 2 at a position in the path of movement of the pin bars 18 outwardly of the edge of a print carried by the said pin bar. The arm 56 is held in this normal position by means of a pull spring 57 which has one end attached as at 58 to the lower arm of the lever 54. The other end of the spring is attached to a pin 59 projecting from the side 28. Upon engagement of said arm 56 by a pin bar 18, the same will be swung about the axis of the shaft 55 in a counter-clockwise direction to likewise rotate the shaft 55 and the lever 54 attached thereto. This motion will be transmitted through the link 53 and crank 52 to the shaft 50 to swing the link 49 in a counter-clockwise direction to move the fingers 47 forward to engage the print at the portion thereof moved into the reverse direction to move said portion from beneath the stripper fingers 29 (see Figures 3 and 4) and straighten said inward bend in the print for the same to fall flat into the hypo bath.

As previously stated, the arms 22 are weighted to fall by gravity when free of the pin 46. However, it is desirable that this stripper mechanism be quick in action and positive for any weight of film stock, and to this end a torsion spring 60 encircles the shaft 24, and the arm 61 thereof extends into engagement with the arm 22, and the other arm 62 thereof extends to be engaged by a notched member 63 which is fixed to the casing 34 as by means of screws 64 and extends therefrom on the curvature of an arc whose radius is the center of the shaft 24. This member is provided with a plurality of notches 65, any of which may be engaged by the arm 62 to increase or decrease the tension of the spring in accordance with the particular notch 65 engaged by the said arm 62.

In the operation of the camera as previously stated, the conveyor chain in its path of travel will engage and impale a print P on the bar 18. When the print has been moved to a location over the tank 17, the print is drawn over shaft 40 thence upwardly and downwardly to have a reverse bend placed therein and is then acted upon by the fingers 29 which have been raised by the engagement of the arms 22 by the pin 46 projecting from the chains 12—13. If there is a failure of said fingers 29 to properly dislodge the print from the pin 19, the print will be carried along by the conveyor chain, and in order to prevent such print from being again carried to the point of impaling a further print thereon, a stop motion device designated generally 66 is provided (see Figures 1 and 5). This device comprises a shaft 67 which is journaled in bearings 68 attached to the sides 26—28 of the camera and has mounted thereon disks or drums 69 which are provided on one side thereof with a plurality of radial extending fingers 70. The portion of the shaft adjacent to the side 28 extends beyond the said side and has mounted thereon a cam 71 (Figure 6) which rotates with the shaft 67. A switch 72, which may be of the micro type, is in the circuit of the motor 73 which drives the chain conveyor and has an arm 74 which extends into engagement with the cam 71. Upon rotation of the shaft 67 the cam will operate the switch to open the circuit of the said motor 73 and thereby bring the conveyor to rest. Such prints as may not be properly dislodged from the pin bars 18 will be carried along as previously stated and will be dragged over and in contact with the fingers 70 and thereby rotate the said shaft 67 to actuate the switch 72 as previously described. The fingers 70 will weight the drums 69 in a direction tending to move the same in a counter-clockwise direction as seen in Figure 1. A pin 75 (see Figure 6) projects normally upwardly from the end of the shaft 67 and engages a stop 80 to limit the counter-clockwise movement of the said shaft 67 to position and hold the said fingers 70 in the path of movement of such prints which said stripper may have failed to remove from pin bar 18.

I claim:

1. In photographic apparatus, a conveyor having means for engaging a marginal edge of a print for moving the latter in a path of travel extending forwardly and then in a reverse direction back upon itself, a stripper for engaging the print in the direction of the movement thereof for removing the print from the conveyor while the latter is moving in the said reverse direction, a pusher finger movably mounted for engaging the print at the portion thereof moved in the said reverse direction to move said portion in a forward direction to straighten said print after being released from the conveyor and means for guiding said finger in the movement thereof.

2. In photographic apparatus, a conveyor having means for engaging a marginal edge of a print for moving the latter in a path of travel extending forwardly and then in a reverse direction, a stripper for removing the print from the conveyor while the latter is moving in the said reverse direction, and a pusher finger movably mounted for engaging the print at the portion thereof moved in the said reverse direction to move said portion to straighten said print after being released from the conveyor, and means for moving said finger.

3. In photographic apparatus, a conveyor having a pin bar for engaging a marginal edge of a print for moving the latter in a path of travel extending forwardly and then in a reverse direction, a stripper for removing the print from the pin bar while the print is moving in the said reverse direction, a pusher finger movably mounted for engaging the print at the portion thereof moved in the said reverse direction to move said portion to straighten said print after being released from the conveyor, and means engageable and moved by said pin bar for moving said finger into the said portion.

4. In photographic apparatus, a conveyor having a pin bar for engaging a marginal edge of a print for moving the latter in a path of travel extending forwardly and then in a reverse direction, a stripper for removing the print from the pin bar while the print is moving in the said reverse direction, a plurality of spaced pusher fingers movably mounted for movement in the general direction of the forward path of said print for engaging the portion of said print in the said reverse direction to straighten said portion after being released from the conveyor and means engageable and moved by said pin bar for moving said fingers into the said portion.

5. In photographic apparatus, a conveyor having means for engaging a marginal edge of a print for moving the latter in a path of travel extending forwardly and then in a reverse direction, a stripper for removing the print from the conveyor while the print is moving in the said reverse direction, a guide over which the trailing portion of the print passes at the point of reversal of said path, and a pusher member movably mounted for engaging the print at the portion thereof in the said reverse direction to move said portion in a forward direction to straighten said print after being released from the conveyor, said member having the print engaging portion thereof resting on said guide and guided thereby into engagement with said print portion.

6. In photograph apparatus, a conveyor having means for engaging a marginal edge of a print for moving the latter in a path of travel extending forwardly and then in a reverse direction, a stripper for removing the print from the conveyor while the print is moving in the said reverse direction, a guide over which the trailing portion of the print passes at the point of reversal of said path, and a plurality of pusher fingers movably mounted for engaging the print at the portion thereof in the said reverse direction to move said portion in a forward direction to straighten said print after being released from the conveyor, said fingers having the print engaging portion thereof resting on said guide and guided thereby into engagement with said print portion.

7. In photographic apparatus, a conveyor having a pin bar for engaging a marginal edge of a print for moving the latter in a path of travel extending forwardly and then in a reverse direction, a stripper for removing the print from the pin bar while the print is being moved in the said reverse direction, said stripper embodying a rising and falling arm pivotally mounted at a location forward of the forward path of said conveyor at the said reverse direction of travel thereof, said arm extending toward the path of the said reverse direction, a pusher finger movably mounted at a location opposite to that of the said stripper and movable toward said stripper to engage said print on the side thereof opposite to that engaged by the stripper to push the portion of the print in the path of the said reverse direction forwardly to straighten said print after being released from said conveyor and means including said pin bar for moving said finger into said print.

8. In photographic apparatus, a conveyor having a means for engaging a marginal edge of a print for moving the latter in a path of travel extending generally horizontal in a forward direction, then generally in a vertical direction, and then in a reverse direction, a stripper for engaging and removing the print from the conveyor while the print is being moved in the said reverse direction, said stripper embodying a rising and falling arm rockably mounted at a position forward of the vertical portion of said path and with the free end portion of said arm moving in a path intersecting the said vertical portion, stripper engaging means carried by said conveyor separate of the print engaging portion thereof and extending to engage said arm when said stripper engaging means is in said vertical path portion for raising said arm and movable past the end of said arm out of engagement therewith for said arm to fall and dislodge said print from said conveyor.

9. In photographic apparatus, a conveyor having a means for engaging a marginal edge of a print for moving the latter in a path of travel extending generally horizontal in a forward direction, then generally in a vertical direction, and then in a reverse direction, a stripper for engaging and removing the print from the conveyor while the print is being moved in the said reverse direction, said stripper embodying a rising and falling arm rockably mounted at a position forward of the vertical portion of said path and with the free end portion of said arm moving in a path intersecting the said vertical portion, stripper engaging means carried by said conveyor separate of the print engaging portion thereof and extending to engage with said arm when said stripper engaging means is in said vetrical path portion for raising the same and movable past the end of said arm out of engagement therewith for said arm to fall and dislodge said print from said conveyor and resilient means urging said arm to fall when free of said stripper engaging means.

10. In photographic apparatus, a conveyor having a means for engaging a marginal edge of a print for moving the latter in a path of travel extending generally horizontal in a forward direction, then generally in a vertical direction, and then in a reverse direction, a stripper for engaging and removing the print from the conveyor while the print is being moved in the said reverse direction, said stripper embodying a rising and falling arm rockably mounted at a position forward of the vertical portion of said path and with the free end portion of said arm moving in a path intersecting the said vertical portion, stripper engaging means carried by said conveyor separate of the print engaging portion thereof and extending to engage said arm when said stripper engaging means is in said vertical path portion for raising the same and movable past the end of said arm out of engagement therewith for said arm to fall and dislodge said print from said conveyor and adjustable resilient means urging said arm to fall when free of said stripper engaging means.

11. In photographic apparatus, a conveyor having means for engaging a marginal edge of a print for moving the latter in a path of travel extending forwardly, then in a reverse direction and then again forwardly, a stripper for engaging and removing the print from the conveyor while the print is being moved in the said reverse direction, a plurality of pusher fingers movably mounted and movable into the position of the print in the path of reverse direction thereof for pushing said portion forwardly to straighten said print after being released from said conveyor, a stop motion element positioned in the last said forward path of movement of a print for the engagement thereof by said print to operate the stop motion to bring the conveyor to rest upon failure of said stripper to release a print from said conveyor.

ADAM N. RITTINGER.

References Cited in the file of this patent

UNITED STATES PATENTS

| Number | Name | Date |
| --- | --- | --- |
| 1,709,788 | Greene | Apr. 16, 1926 |
| 1,820,182 | Cooper | Aug. 25, 1931 |
| 1,827,392 | Greene et al. | Oct. 13, 1931 |